Jan. 11, 1955  R. L. WRINKLE  2,699,072
POWER TRANSMISSION APPARATUS
Filed April 19, 1954  2 Sheets-Sheet 1
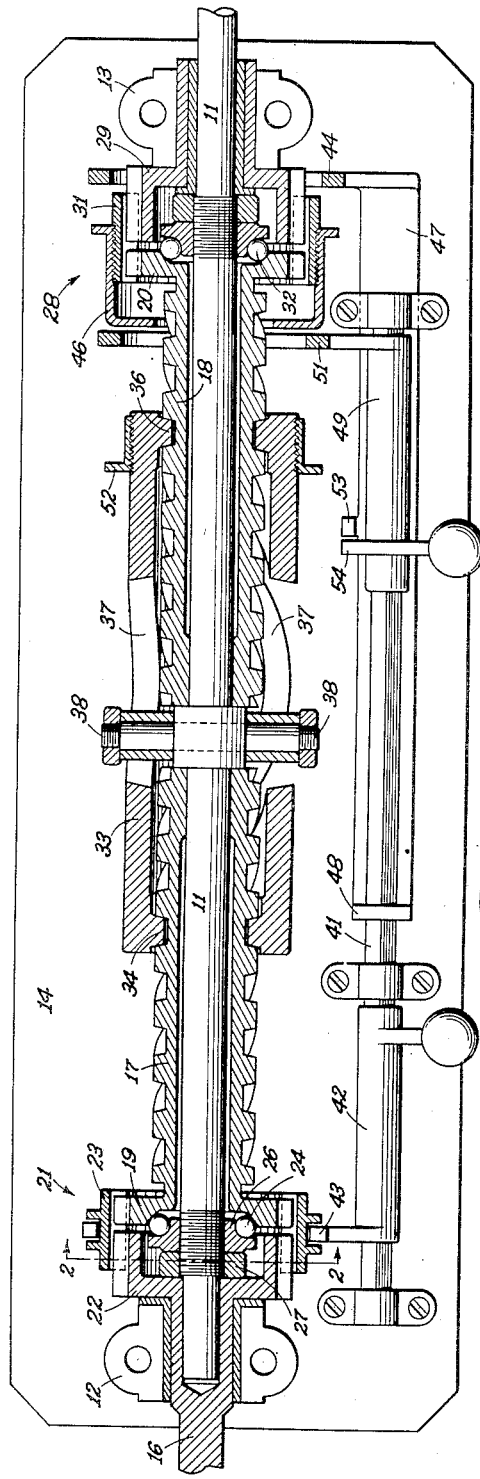
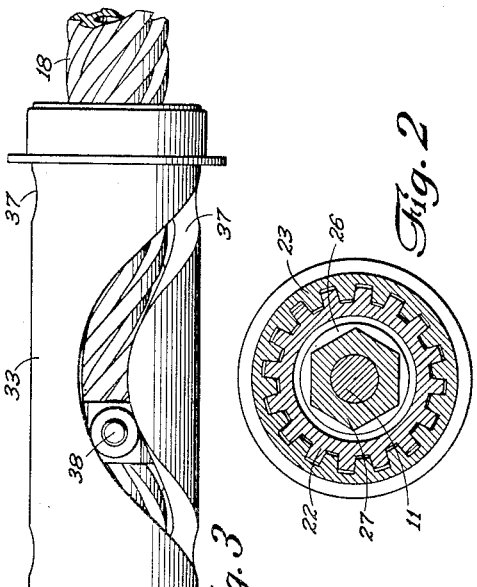
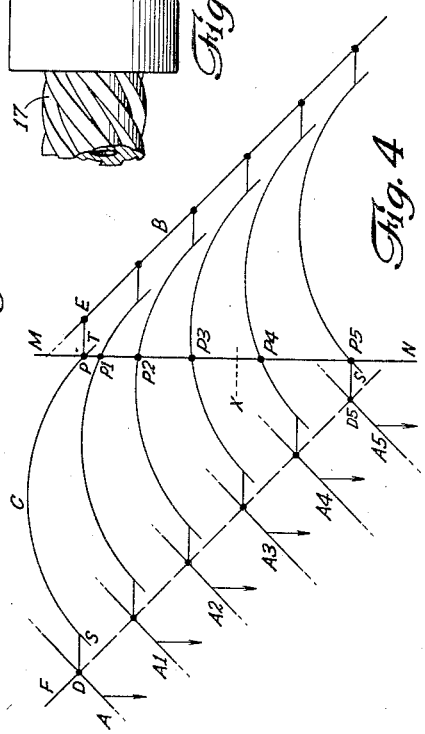
INVENTOR.
Raymond L. Wrinkle
BY

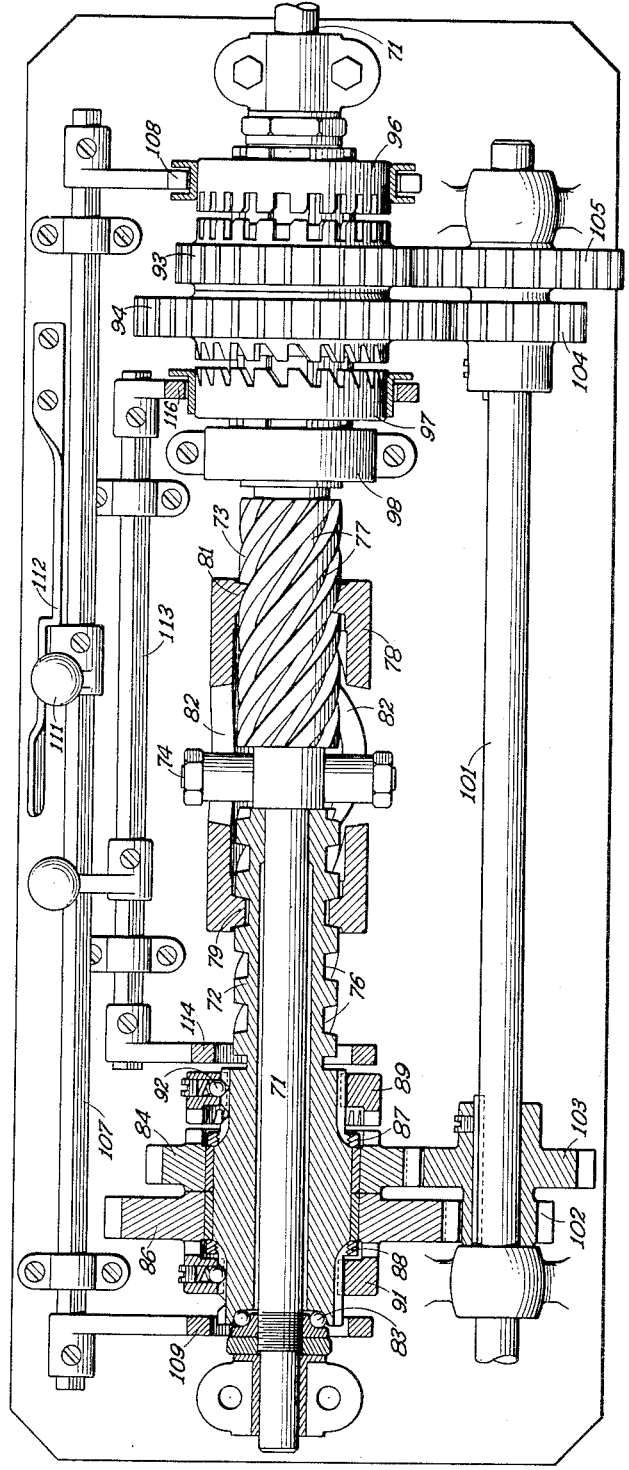

United States Patent Office 2,699,072
Patented Jan. 11, 1955

2,699,072
POWER TRANSMISSION APPARATUS

Raymond L. Wrinkle, Oakland, Calif.

Application April 19, 1954, Serial No. 423,937

18 Claims. (Cl. 74—363)

The present invention relates to apparatus for mechanically transmitting power and in particular to means for the gradual application of power from a drive member to a driven member without conventional hydraulic or friction clutch means.

The present invention is particularly adapted for use with rotating members having different initial velocities and contemplates the provision of differential and reaction members interconnecting same for gradually increasing the velocity of the slower member to that of the faster member. In connection with the transmission of rotary motion, the invention in its simplest form includes a drive member and a reaction member rotatably mounted upon a rotatable shaft to be driven and a differential member engaging the shaft and both the drive and reaction member by groove and follower means whereby the differential member travels axially of the combination to smoothly vary the rotational velocity of the driven member to that of the drive member. The differential and reaction member apply to the driven member a high torque at maximum velocity variation between the drive and driven members with the torque decreasing as the velocity of the driven member increases, and the drive and driven members are positively and mechanically engaged under idle conditions with the application of driving force occurring after connection. The advantages of a positive mechanical power transmission as herein provided are manifold, as for example, in the elimination of friction and hydraulic clutches which absorb large amounts of power and which requires considerable maintenance. Also the present invention is particularly adapted to the transmission of power over a very wide velocity range and in this respect there is included herein a description of a step power transmission admirably adapted for automotive or like application.

It is an object of the present invention to provide mechanical power transmission apparatus having a differential member linking a drive member and a driven member for rotation and translation relative thereto whereby even power application from one to the other is effected.

It is another object of the present invention to provide power transmission apparatus including a differential member engaging by groove and follower means rotatably mounted drive and driven elements and a reaction member for directing translation and rotation of the differential member to gradually vary the speed of said driven member to that of the drive member.

It is a further object of the present invention to provide a differential member engaging by groove and follower means a pair of axially spaced cylinders and cammed to a coaxial shaft with means for driving and releasing said cylinders whereby rotational motion is smoothly transmitted to the shaft.

It is yet another object of the present invention to provide means mounted for rotation and translation and engaging a pair of rotatably mounted members for increasing the rotational velocity of the slower member to that of the faster member.

It is still another object of the invention to provide in apparatus of the class described a pair of drive members mounted for rotation upon a driven shaft with a differential element engaging by groove and follower means both drive members and driven shaft for raising the rotational velocity of said driven shaft to that of the fastest drive member and means automatically engaging and disengaging said drive members.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

The invention is illustrated in the accompanying drawings wherein:

Figure 1 is a plan view in center section of an embodiment of the invention.

Figure 2 is a transverse sectional view taken at 2—2 of Figure 1.

Figure 3 is a front view of the differential member of Figure 1 in mounted position.

Figure 4 is a diagram illustrating the motion of the various elements of the embodiment of Figure 1.

Figures 5 and 6 are diagrams illustrating the motion of various elements of the invention under conditions later specified as to variations in relation of the elements.

Figure 7 is a plan view in center section of an alternative embodiment of the invention.

Considering now the structural details of the invention and referring first to the embodiment thereof illustrated in Figure 1, there is provided a driven shaft 11 mounted in a pair of spaced bearings 12 and 13 which in turn are rigidly secured to a mounting plate or the like 14. The driven shaft 11 extends from one of the bearings 13 for connection to means to be driven and terminates at the other end within bearing 12 in rotational engagement with a drive shaft 16 about this end of the driven shaft 11 and also extending through the bearing 12. Between the aforesaid bearings about the driven shaft 11 is disposed the power transmission apparatus of the present invention including a pair of cylinders mounted coaxially about the driven shaft 11 and herein denominated for convenience as a drive cylinder 17 adjacent the drive shaft 16 and a reaction member or cylinder 18 axially spaced from the drive cylinder 17. The cylinders 17 and 18 are provided on their outer surfaces with helical grooves of opposite pitch and a like size. The cylinders 17 and 18 respectively are provided at their outer ends with radially extending flanges 19 and 20, and there are formed upon the outer periphery of these flanges axial splines for engagement with connecting means adapted to control the rotary motion of the drive cylinder 17 and reactor 18.

Connecting means 21 are provided to engage and disengage the drive cylinder 17 from the drive shaft 16 and the latter includes a radially extending flange 22 about the inner end of the drive shaft 16 with axial splines formed about the periphery thereof in alignment with like splines upon the drive cylinder flange 19. A hollow cylindrical sleeve 23 having axial splines on the inner circumference thereof is disposed about the flanged ends of the drive shaft and drive cylinder in splined engagement therewith. This connecting sleeve 23 is thus adapted to slide axially upon either of the flanges 19 or 22 into and out of engagement with the other flange so that movement of this sleeve operates to engage or to disengage the drive shaft 16 with the drive cylinder 17. The outer end of the drive cylinder 17 is carried by ball bearings 24 disposed between a portion of the cylinder flange 19 forming an outer bearing race, and an inner bearing race 26 threaded upon the driven shaft 11 and maintained in position by a spacer 27 between same and the drive shaft flange 22. The inner end of the drive cylinder 17 slip fits the drive shaft 11.

At the outer end of the reactor 18 there is provided another connecting means 28 similar to connecting means 21 and including a hollow cylinder 29 having axial splines on the outer periphery thereof in alignment with like splines about the reactor flange 20 and including a portion of reduced diameter extending through the bearing 13 about the drive shaft 11. A hollow sleeve 31 is disposed about the cylinder 29 with axial splines upon the inner circumference thereof engaging the splines about the cylinder 29 and adapted for axial translation into and out of engagement with the reactor flange 20 for engaging and disengaging the reactor and cylinder 29. The cylinder 29 is fixed in position within the bearing 13 so as not to rotate and may have a bushing interior thereto about the driven shaft 11 for carrying same. The reactor 18 is mounted in the same manner as the drive cylinder 17 with the flange 20 forming the outer race of a ball bearing 32, and the inner end of the reactor 18 snugly fitting the shaft 11. Connecting means 28 is thus operable to hold reactor 18 against rotation or to release the reactor 18 for rotation in response to the movement of the sleeve 31.

Interconnection of the above described elements and the drive shaft 11 is provided by a differential member or cylinder 33 disposed coaxially with the drive shaft 11 about the drive cylinder 17 and reactor 18. The differential member 33, shown in Figures 1 and 3, engages the drive cylinder 17 by threads 34 at one end thereof and engages the reactor 18 by threads 36 at the opposite end thereof with the threads 34 and 36 necessarily traveling along the outer grooved surfaces of drive cylinder 17 and reactor 18 upon rotation thereof. There is formed in the differential member 33 a pair of like opposed cam slots 37 extending substantially between the ends of the differential member 33, as in a parabolic curve. The differential member 33 engages the driven shaft 11 by means of a pin 38 secured to the shaft 11 and extending radially therefrom through the cam slots 37 in the differential member 33. The pin 38 or an expanded base thereof separates the adjacent ends of the drive cylinder 17 and reactor 18, and rollers may be provided about the outer ends of the pin 38 for rolling contact with the cam slots 37. The pin 38 is rigidly secured to the driven shaft 11 so as to rotate therewith and it will be appreciated that translation of the differential member 33 axially of the driven shaft 11 will rotate the latter by means of the pin 38 and in a manner dictated by the curvature of the cam slots 37.

A control mechanism for the above described elements is provided adjacent thereto and includes a square bar 41 extending through a plurality of supports mounted upon the plate 14 disposing bar 41 in parallelism with the driven shaft 11. Adjacent the connecting means 21, above described, there is provided a sleeve 42 about the square bar 41 and slidable longitudinally thereof. A shift fork 43 extends perpendicularly from the sleeve 42 into engagement with the sleeve 23 of the connecting means 21 between a pair of spaced radial flanges on the outer circumference of this sleeve so that longitudinal motion of the control sleeve 42 moves the connecting means 21 and more particularly the sleeve 23 thereof upon the drive shaft flange 22 into and out of engagement with the drive cylinder flange 19. The longitudinal motion of the control sleeve 42 is limited by a pair of support members of the control shaft 41 spaced so that the sleeve 23 of the connecting means 21 cannot be moved so far as to disconnect same from the drive shaft flange 22. Controlling operation of the other connecting means 28 is a shift ring 44 disposed concentric to the sleeve 31 and radially outward thereof for movement axially of driven shaft 11 to engage a shell 46 threaded about the inner end of the sleeve 31 and extending toward the pin 38 therefrom. The shift ring 44 is connected to an elongated bar 47 extending along the control bar 41 and having a lip 48 thereon about the bar 41 adjacent the end of the control sleeve 42. A second sleeve 49 is disposed about the control bar 41 and has a shift ring 51 attached thereto and disposed about the reactor 18 between the shell 46 and a radially extending flange 52 threaded upon the end of the differential member 33 so that sliding of the sleeve 49 to the left in Figure 1 engages the shift ring 51 with the flange 52 to move the differential member all the way upon the drive cylinder 17. Movement of this sleeve 49 to the left in Figure 1 brings same into contact with the lip 48 upon the bar 47 so as to move the shift ring 44 into contact with the shell 46 whereby the sleeve 31 of the connecting means 28 moves into engagement with the reactor flange 20 to lock the reactor 18 and the cylinder 29 together in immobile position. A lug 53 upon the bar 47 is disposed in position to engage a projecting lug 54 upon the sleeve 49 to the left thereof so that return of the sleeve 49 to its original position, all the way to the right in Figure 1, also moves the bar 47 to a like position so that the shift ring 44 is moved out of contact with the shell 46.

With regard to the operation of the above described embodiment of the invention reference is first made to Figure 4, wherein motion of various elements of the apparatus are considered to take place in the plane of the figure.

The rotary motion of the elements in Figure 1 is represented in the diagram by vertical motion. The figure DCE in the diagram represents the differential member or cylinder 33; the points D and E represent the threads 34 and 36 on opposite ends of the cylinder 33; and the arc C, terminating in straight line segments S and T, represents one of the cam slots 37 in cylinder 33. As all fixed points on cylinder 33 have the same rotational as well as the same axial motion, so in the diagram, all fixed points on the figure DCE have the same vertical and horizontal motion. The line B represents a thread on the reaction cylinder 18 in fixed position. The point E moving on B represents a thread 36 on cylinder 33 following a thread on reaction cylinder 18. Another fixed point on the figure DCE, such as D, will follow an imaginary line parallel to B such as F. The line segment A represents a portion of a thread on the drive cylinder 17 and the point D moving on A represents a thread 34 on cylinder 33 following a thread on the drive cylinder 17. With the line A moving vertically as indicated by the arrows and at constant speed all fixed points on figure DCE will move parallel to B at a constant speed. The successive positions of A, from A1 to A5, represent a uniform rate of rotation of the drive cylinder 17. The point P represents the pin 38 in Figure 1. Whereas pin 38 in fact rotates in a plane, the point P moves on the vertical line MN, and as pin 38 moves in slot 37, so point P moves on arc C. As above stated, arc C terminates in straight segments S and T, with S parallel to A and T parallel to B. When figure DCE is in a position where P lies on the segment T any motion of A will cause figure DCE to move along line B without changing the position of point P on the line MN. This is shown by extending B to intersect MN. This point of intersection will always be the same distance from the intersection of T with MN since T is at a fixed distance from B and parallel to B. Any vertical motion of B would be entirely transmitted to point P. In the first position of DCE the point P lies on the curve where the segment T joins the arc C. As DCE moves downward on B the arc C intersects line MN at increasing intervals and the point P moves with an accelerated motion from P1 to P5. In the last position P has reached the point on arc C where C is parallel to A and joins the straight segment S. When P is on S it moves with the same speed as A since it now has the same relation to A as it had to B at the beginning of the motion. Another explanation is that the pressure of DCE on P is on a line parallel to the line of pressure of A on DCE. In this position, motion of B has no effect on P and it will be shown that the reaction member 18 corresponding to B will be disengaged from operation at this point.

Actual operation of the above described embodiment of the invention is quite simple and follows directly from the diagram of Figure 4. The position of the elements of the invention illustrated in Figure 1 is an intermediate one corresponding to point X on the diagram of Figure 4 and with regard to the initiation of operation, the connecting sleeve 23 is first moved to the left by the shift fork 43 to free the drive cylinder 17 and similarly the connecting sleeve 31 is moved to the right by the shift ring 51 to free the reactor 18. The differential member 33 is then moved entirely to the left by the shift ring 51 and in the process thereof the control sleeve 49 engages the lip 48 of the bar 47 to move the shift ring 44 to the left and lock together the reactor flange 20 and the cylinder 29 so that the reactor cannot rotate. Return of the control sleeve 49 to the right engages the lugs 53 and 54 to return the bar 47 and shift ring 44 to the right so that the connecting sleeve 31 is then free to be moved during subsequent operations. The transfer of rotary motion to the driven shaft 11 from the then rotating drive shaft 16 is accomplished from this initial position by movement of the control sleeve 42 to the right whereby shift fork 43 moves the connecting sleeve 23 to the right engaging the splines thereof with splines of the drive cylinder flange 19, locking together the drive shaft 16 and the drive cylinder 17. The parts of the apparatus are then in the first position shown in Figure 4 and with the curve of the cam slots terminating in segments of constant pitch equal to the pitch of the helical grooves in the drive cylinder 17 and reactor 18 adequate time is provided for operation of the connecting means 21 and 28 at the beginning and end of acceleration. The drive cylinder 17 is rotated clockwise, as seen from the left, by the drive shaft 16 and with left hand threads or grooves upon the drive cylinder 17 and right hand threads or grooves upon the reactor 18 the differential member 33 is moved to the right onto the reactor 18 following the threads thereof by the threads 36 engaging same. As the reactor 18 is held stationary, translation and rotation of the differential member 33 rotates the pin 38 at an increasing rate dependent upon the curvature of the cam slots 37 and as the differential member 33 approaches the end of its travel to the right it passes through the shift ring 51 into engagement with the shell 46, forcing same to the right and disengaging the sleeve 31 from the reactor flange 20. Thus, at the end of travel of the differential member 33, the reactor 18 is freed to rotate and the driven shaft 11 and pin 38 are rotating at the velocity of the drive shaft 16. There will thus be seen to have been accomplished the acceleration of the driven shaft 11 from its initial rotational velocity to the rotational velocity of the drive shaft 16 and further that a high torque is applied to the driven shaft 11 at initiation of rotation thereof with a subsequent decreasing torque application with increasing acceleration thereof, the reactor 18 serving as a converter in this respect.

Material advantage will be seen to lie in the application of maximum torque at the initiation of acceleration for by this means minimum driving power is required to accelerate as well as to maintain final velocity. Considerable flexibility is inherent to the present system in that the acceleration curve is readily determinable by the provision of appropriate cam curves in the differential member, the parabolic curvature being cited merely by way of illustration, as providing uniform acceleration.

Certain of the elements of the invention above described are not inflexibly formed as illustrated, but instead numerous variations therein are possible either for convenience or to the end of altering the characteristics of the apparatus. Thus, for example, the grooves on the drive and/or reaction cylinders need not be of a constant pitch and these elements may comprise either variable pitch cams or screws so that the differential member would then receive a differing accelerating motion. There is illustrated in the diagram of Figure 5, apparatus wherein part of the acceleration of the driven shaft results from the varying pitch of the drive means and part from the varying pitch of the differential members. The various points and lines of the diagram are lettered the same as the lines and points of Figure 4 relating to the same elements and the arc C or cam slot curve will be seen to be parallel at point P to the curve B of the reactor at E and to be parallel at the point P4 to the drive cylinder groove A4 at the point D4. The vertical motion of C is seen here to be accelerated rather than constant as in Figure 4 owing to the varying pitch of the grooves on the drive and reaction cylinders. Likewise, Figure 6 illustrates a further modification wherein all of the acceleration of the driven shaft is produced by the variation in pitch of the drive and reaction cylinders and the cam slot C is a straight line. As to other possible variations it will be seen that the differential member may be formed as a differential screw driven by two nuts replacing the drive and reaction cylinders and also that the cam could be formed on the driven element with the follower upon the differential member. Additionally, the differential cylinders may be disengaged by traveling off of the end of the reaction cylinder rather than by releasing the latter to rotate and the differential member may be engaged and disengaged from the drive and reaction cylinders rather than the latter from the drive means and stationary member respectively.

It will be apparent that either or both ends of the apparatus may be employed as the drive means and in this respect the embodiment of Figure 7 illustrates one particular method of utilizing this advantage wherein successive accelerating steps are provided. For convenience the various elements of the embodiment of Figure 7 are shown in the same form and relation as previously described in connection with Figure 1.

Referring now to Figure 7 there will be seen to be provided a driven shaft 71 mounted for rotation in spaced bearings that are in turn rigidly secured to a mounting plate or the like and disposed concentrically about this shaft 71 in rotatable relation thereto are a pair of axially spaced cylinders 72 and 73, separated by a pin 74 extending radially from the shaft 71 and having rollers upon the ends thereof, as shown. The adjacent portions of the cylinders 72 and 73 respectively have grooves 76 and 77 formed on the outer circumference thereof with the grooves 76 being left hand and the grooves 77 being right hand. These grooves may be in the form of helixes of equal pitch with the distance between corresponding turns on the cylinders remaining the same or may alternatively be spirals of varying pitch, as explained in connection with Figures 5 and 6, with the distance between corresponding turns on the cylinders varying from end to end.

A cam cylinder or differential member 78 is disposed about the drive cylinders 72 and 73 and is provided with lugs or threads 79 and 81 at opposite ends thereof engaging the grooves 76 and 77 respectively. Two identical curved cam slots 82 are formed in cylinder 78 extending between the ends thereof with end segments of pitch equal to the pitch of grooves 76 and 77, the pin 74 engaging these cam slots 82.

The outer ends of the drive cylinders 72 and 73 are elongated over similar elements of the embodiment of Figure 1 and considering in some detail the left cylinder 72, same is formed at its outer end as the outer bearing race of a ball bearing 83 upon which it rides, the inner end of the cylinder 72 fitting the shaft 71 as shown so that the cylinder is supported at each end for rotation on the shaft 71. A pair of gears 84 and 86 of different diameters are mounted for rotation upon the elongated portion of the drive cylinder 72 and maintained in axial position on the shaft by retaining rings 87 and 88 threaded to the cylinder 72. The gears 84 and 86 are individually engageable to the drive cylinder 72 by means of a pair of toothed connecting rings 89 and 91 splined to the cylinder on opposite sides of said pair of gears and adapted to individually engage axial teeth upon the gears 84 and 86 respectively. The smaller gear 84 is disposed closest to the grooves 76 on the drive cylinder 72 and the connecting ring 89 inboard thereof and adapted for engagement therewith includes a spring loaded ball 92 adapted to engage one or the other of a pair of circumferential V slots in the drive cylinder so that the connecting ring 89 will only remain in one of the two positions determined by these slots. The outer connecting ring 91 is similarly constituted so that it too moves positively only between two positions with one placing the teeth thereof in complete engagement with the teeth on the gear 86 and the other positioning said teeth entirely out of engagement with the gear teeth. The other end of the unit is quite similar in that a pair of gears 93 and 94 are disposed in rotatable relation upon the drive cylinder 73 and are controllably engageable therewith by means of a pair of toothed connecting rings 96 and 97 respectively. As will be seen from the right hand portion of Figure 7, the teeth upon the connecting ring 97 and the engaging teeth on the gear 94 are formed so that a drive connection is possible in only one direction and relative rotation of the elements in the opposite direction serves to force the teeth apart, as is the case with the gears on the other drive cylinder 72 and as noted in more detail below. About the right drive cylinder 73 outward of the grooves 77 thereon is a one-way brake 98 engaging the drive cylinder 73 and permitting rotation in only one direction, in the illustrated case in the right hand direction as the apparatus is viewed from the left in Figure 7. Of the four gears mounted upon the drive cylinders, in order of decreasing teeth diameter they are 86, 94, 84, and 93.

It is contemplated in this embodiment that the shaft 71 is to be driven through the above-noted gears and to this end a drive shaft 101 is mounted for rotation parallel to the shaft 71 and there are mounted in fixed relation upon the drive shaft 101 four drive gears 102, 103, 104, and 105. The smallest of these drive gears 102 meshes with the largest gear 86 on the drive cylinder 72 and the remaining drive gears mesh with the other gears on the driven shaft 71 so that all of the gears rotate at all times the drive shaft 101 is rotated.

The engagement of the various driven gears with their drive cylinders is controlled by means including a first square control bar 107 slidably mounted parallel to the shaft 71 and having a shift fork 108 engaging the connecting ring 96 for moving same in both directions longitudinally of the shaft 71 and a shift ring 109 outward of the connecting ring 91 for moving same only into engagement with the gear 86. A knob 111 upon the control bar 107 may be employed to slide same and a spring catch 112 engages same to the right thereof to prevent inadvertent overtravel of same when releasing the connecting ring 96 from gear 93. A second control bar 113 also mounted to slide longitudinally parallel to the shaft 71 has a pair of shift rings 114 and 116 secured fast thereto for engaging the connecting rings 89 and 97 respectively and individually moving same outward into engagement with their respective gears 84 and 94.

Considering now the operation of the embodiment of the invention illustrated in Figure 7, the drive shaft 101 is rotated in a counter-clockwise direction as seen from the left end by external means, not shown, and the gears 102—105 attached thereto rotate therewith. The gears 84, 86, 93, and 94 are driven by the drive gears 102—105 and rotate freely upon the drive cylinders 72 and 73 with the respective connecting rings out of engagement therewith. With the cam cylinder 78 entirely to the left in so that the teeth 79 thereon engages the outer end of the grooves 76 the first control bar 107 is slid to the right, as by the knob 111, thereby moving the shift ring 109 against the connecting ring 91 and forcing same into toothed engagement with the large gear 86. The drive cylinder 72 is thus locked to the gear 86 and rotates clockwise therewith, as seen from the left, to rotate the cam cylinder 78, and the other drive cylinder 73 which tends to rotate in a counter-clockwise direction by virtue of the opposite threads thereon is prevented from so doing by the one-way brake 98. The cam cylinder thus travels to the right following the grooves on the drive cylinders and rotates to move the pin 74 in the cam slot 82 therein so that the shaft 71 is accelerated to the velocity of the drive cylinder 72, as explained in connection with Figure 1. At the end of travel of the cam cylinder 78 the shaft 71 is rotating at the same speed as the gear 86 and drive cylinder 72 so there is no back pressure on the drive cylinder 73. The next acceleration step is accomplished by sliding the second control bar 113 to the right whereby the shift ring 116 contacts the connecting ring 97 and slides same into toothed engagement with the gear 93 rotating somewhat faster than the first gear 86. The drive cylinder 73 is thereupon rotated at a greater velocity than the drive cylinder 72 so that the cam cylinder 78 is moved to the left along the drive cylinder grooves 76 and 77 thereby further increasing the rotational velocity of the driven shaft up to the speed of the gear 94. As the cam cylinder 78 approaches or reaches the end of travel the drive cylinder 72 is urged to a greater speed than the gear 86 so that it tends to drive the gear 86 through the connecting ring 91 and as the mating teeth of these members are formed only for one way rotational drive from the connecting ring to the gear this forces the connecting ring away from the gear. As the connecting ring 91 moves away from the gear by the above-noted mechanism the spring-loaded ball thereof is forced out of the slot in which it rests and passes over center into the next slot to move the connecting ring entirely out of engagement with the gear 86 so that the latter rotates free upon the drive cylinder 72. To further increase the velocity of the shaft 71 the second control bar 113 is moved to the left whereby the shift ring 114 forces the connecting ring 92 into engagement with the gear 84, rotating the drive cylinder 72 at the increased speed thereof to drive the cam cylinder 78 to the right and accelerate shaft 71. As the cam cylinder comes to the end of travel on the drive cylinder 73 the connecting ring 97 thereof rotates faster than the gear 94 and disengages itself. In like manner further acceleration of the shaft 71 is accomplished by moving the control bar 107 to the left to move the connecting ring 96 into engagement with the gear 93 by the shift fork 108 so that the drive cylinder 73 is rotated at an increased speed and the cam cylinder 78 travels onto the other drive cylinder 72 thereby further increasing the rotational velocity of the shaft 71. The spring catch or stop 112 prevents inadvertent contact of the shift ring 109 with the connecting ring 91 when the control bar 107 is moved to the right for disengaging the gear 93, as in stopping the shaft 71.

What is claimed is:

1. Power transmission apparatus comprising a driven shaft, a drive member rotatably mounted upon said shaft, a reaction member rotatably mounted on said shaft, and a differential member about said shaft engaging said drive member and said reaction member by groove and follower means for movement axially of said shaft with rotation of said drive member relative to said reaction member, and engaging said shaft by cam and follower means for transmitting to said shaft rotational motion with axial travel of said differential member along said shaft.

2. Power transmission apparatus comprising a shaft mounted for rotation about the axis thereof, a drive cylinder mounted for rotation on said shaft and having grooves thereon, a reaction member mounted for rotation on said shaft and having opposed grooves thereon, and a differential element engaging said drive cylinder and reaction member by the grooves thereon and engaging said shaft in cammed relation thereto, said differential element traveling in response to rotation of said drive cylinder axially of said shaft from said drive cylinder onto said reaction member for imparting rotary motion to said shaft in proportion to axial differential travel.

3. Power transmission apparatus comprising a driven shaft mounted for rotation, a drive member mounted for rotation upon said shaft and having helical grooves thereon, a reaction member mounted for rotation upon said shaft and having helical grooves thereon, and a differential member having a curved slot therein slidably engaging a radial projection on said shaft and engaging said drive member and reaction member by the grooves therein whereby said differential member moves axially of said shaft upon rotation of said drive member with respect to said reaction member for imparting rotational motion to said shaft.

4. Power transmission apparatus comprising a driven shaft mounted for rotation, a pair of like axially spaced drive cylinders mounted for rotation upon said shaft and having on the outer surfaces thereof opposed helical grooves, a third hollow cylinder disposed about said shaft and said pair of drive cylinders and having a pair of spaced lugs extending radially inward thereof into engagement with the grooves in each of said drive cylinders, a radial projection upon said shaft intermediate said drive cylinders and engaging said third cylinder in a curved slot therein, and means for engaging said drive cylinders to rotate one and fix the other whereby rotational drive of one drive cylinder axially displaces said third cylinder axially of said shaft and drive cylinders for transmitting rotational motion to said shaft.

5. Power transmission apparatus comprising a rotatably mounted shaft, a pair of cylinders rotatably mounted upon said shaft in axial alignment, means for rotating at least one of said cylinders and maintaining the other stationary, a third cylinder about said pair of cylinders coaxial therewith and engaging same by groove and follower means for translation therealong with rotation of either of said pair of cylinders relative to the other, and cam and follower means connecting said third cylinder and said shaft for transmitting rotary motion to said shaft with translation of said third cylinder.

6. Power transmission apparatus comprising a pair of rotatably mounted drive cylinders disposed in spaced relation upon a common axis, a differential member engaging said pair of cylinders by groove and follower means in opposite threaded engagement with each of said cylinders, a rotatably mounted driven member disposed coaxially with said drive members and engaging said differential member by cylindrical cam and follower means with the cam surface being curved to substantially the groove pitch of each differential-drive member engagement, and means for rotating at least one of said drive members and maintaining the other stationary.

7. Power transmission apparatus comprising first, second, and third rotatably mounted members having a common axis with the first and second members axially spaced, a differential element having the same axis of rotation as said members and engaging said first and second members by groove and follower means and said third member by guide and follower means, and means for rotating one of said members and holding another stationary to accelerate the third to the rotational velocity of that of the rotated member.

8. Power transmission apparatus comprising a shaft, a pair of spaced cylinders mounted for rotation upon said shaft and having helical grooves of opposite pitch thereon, a differential cylinder disposed coaxial with said shaft in engagement with the grooves upon said pair of cylinders and having a curved cam slot therein, said shaft having a radial cam follower affixed thereto engaging said differential cam slot, and means for rotating at least one of said cylinders while maintaining the other stationary whereby said shaft is smoothly accelerated to the speed of said rotated cylinder.

9. An improved clutch comprising a shaft to be rotated, a pair of cylinders spaced apart on said shaft for rotation thereon, a differential member disposed about said shaft and engaging said cylinders by groove and follower means, said differential member engaging one cylinder in right hand threaded engagement and the other in left hand threaded engagement whereby said differential member is adapted to travel along said cylinders, cam and follower means connecting said differential member and shaft, and means for maintaining one of said cylinders stationary while the other is driven whereby said differential member traverses said cylinders and accelerates said shaft.

10. An improved clutch as defined in claim 9 further defined by means releasing said stationary cylinder at the end of travel of said differential member whereby both cylinders and differential members rotate with said shaft at the same speed.

11. Power transmission apparatus comprising a shaft, a drive cylinder and a reaction cylinder mounted for rotation upon said shaft in spaced alignment, said drive cylinder and reaction cylinder each having helical grooves on the outer surfaces thereof with one being a right hand thread and the other a left hand thread, a differential cylinder threaded between said drive and reaction cylinders and having a curved cam slot therein, a radial cam follower upon said shaft engaging said differential cylinder, said drive cylinder being adapted for rotation, and means releasably retaining said reaction cylinder stationary whereby said shaft is accelerated to the speed of said drive cylinder by translation and rotation of said differential cylinder.

12. Power transmission apparatus as defined in claim 11 further characterized by said differential cylinder cam slot terminating in segments having curvatures equal to the pitch of the grooves on said drive and reaction cylinders.

13. Apparatus as set forth in claim 11 in which means are provided for releasing said reaction cylinder upon said shaft reaching the speed of said drive cylinder.

14. Power transmission apparatus comprising first and second parallel shafts, a pair of drive cylinders coaxial with said first shaft, a differential member coaxial with said drive cylinders and said first shaft and engaged to each by guide and follower means for generally axial movement therealong, and means for engaging each of said drive cylinders with said second shaft whereby the rotational speed of each of said drive cylinders may be alternately increased over the speed of the other, thereby accelerating the rotational speed of said first shaft through successive steps.

15. Power transmission apparatus comprising a rotatable driven member having a pin extending radially therefrom, a pair of cylindrical drive elements mounted for rotation upon said driven element on opposite sides of the pin thereof, said drive elements having spiral threads on the outer surface thereof with the threads on one being left handed and on the other being right handed, a cylindrical differential member threaded on each of said drive elements and having a curved cam slot therein extending generally axially thereof and terminating in segments of the same pitch as the spiral threads on the drive elements with the pin of said driven member engaging said cam slot, and actuating means for each of said drive elements for moving said differential member axially thereof to accelerate said driven member from the speed of one to the speed of the other of said drive elements.

16. Power transmission apparatus for accelerating a driven shaft in a series of steps to a desired rotational velocity comprising a pair of drive cylinders mounted for rotation on said driven shaft and each having helical grooves thereon, with the grooves on one being reversed from the grooves on the other, a differential member engaging the grooves on said drive cylinders and having a curved cam slot therein, a pin fixed to said driven shaft and extending radially thereof between said drive cylinders into engagement with said cam slot, a plurality of rotational members mounted for free rotation upon said drive cylinders and adapted to rotate at different speeds, a one-way brake engaging one of said drive cylinders and limiting rotation thereof to one direction, a plurality of one-way connecting means adapted to individually connect each rotational member to its respective drive cylinder for rotation thereof in one direction only and means for actuating said connecting means individually to connect rotational members of increasing speed successively to a drive cylinder whereby said differential member travels back and forth upon said drive cylinders to accelerate said driven shaft in successive steps.

17. Power transmission apparatus comprising a driven shaft mounted for rotation, a pair of cylinders mounted for rotation upon said shaft, a differential cylinder engaging by groove and follower means each of said cylinders, and engaging by cam and follower means said shaft, and means for actuating said pair of cylinders for rotating one and holding the other stationary whereby said differential cylinder travels along same to accelerate said shaft to the velocity of the rotating cylinder.

18. Power transmission apparatus comprising first, second and third members in spaced relation on a common axis, a fourth member mounted for rotation and translation on said common axis, guide and follower means operatively engaging said fourth member with each of said first, second and third members for generally axial movement therealong, said guide and follower means including at least one variable pitch guide, relative rotation of said first and second members causing axial motion of said fourth member and rotation of said third member with a velocity which varies from the velocity of one to the velocity of the other of said first and second members, means for clutching and automatically de-clutching at least one of said first and second members.

No references cited.